United States Patent
Erhard et al.

(10) Patent No.: US 11,478,993 B2
(45) Date of Patent: Oct. 25, 2022

(54) FUEL TANK FOR A MOTOR VEHICLE, AND METHOD FOR PRODUCING A FUEL TANK

(71) Applicant: Bayerische Motoren Werke Aktiengesellschaft, Munich (DE)

(72) Inventors: Daniel Erhard, Fuerstenfedlbruck (DE); Moritz Holtdirk, Lippstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 220 days.

(21) Appl. No.: 16/890,837

(22) Filed: Jun. 2, 2020

(65) Prior Publication Data

US 2020/0290288 A1 Sep. 17, 2020

Related U.S. Application Data

(63) Continuation of application No. PCT/EP2018/076204, filed on Sep. 27, 2018.

(30) Foreign Application Priority Data

Dec. 8, 2017 (DE) ...................... 10 2017 222 250.6

(51) Int. Cl.
*B29C 65/02* (2006.01)
*B60K 15/03* (2006.01)

(52) U.S. Cl.
CPC ........ *B29C 65/02* (2013.01); *B60K 15/03006* (2013.01); *B60K 15/03177* (2013.01); *B60K 2015/03039* (2013.01); *B60K 2015/03059* (2013.01)

(58) Field of Classification Search
CPC .............. B60K 15/03; B60K 15/03006; B60K 15/03177; B29C 65/04; B29C 65/08; B29C 65/14; B29C 65/02

USPC ... 220/564, 562, 4.14, 4.13, 4.12, 4.21, 678, 220/679, 677, 555, 553

See application file for complete search history.

(56) References Cited

U.S. PATENT DOCUMENTS

| | | | | | |
|---|---|---|---|---|---|
| 2,533,431 A | * | 12/1950 | Chausson | .............. | B64D 37/02 220/563 |
| 2,703,607 A | * | 3/1955 | Simmonds | .............. | B64D 37/08 222/394 |
| 4,099,645 A | * | 7/1978 | Muth | ................. | B60K 15/0406 220/203.12 |

(Continued)

FOREIGN PATENT DOCUMENTS

| | | |
|---|---|---|
| DE | 199 43 138 A1 | 3/2000 |
| DE | 199 41 785 A1 | 3/2001 |

(Continued)

OTHER PUBLICATIONS

Translation of WO 00/51858. Zapp. Sep. 8, 2000, pp. 1 and 2. (Year: 2000).*

(Continued)

*Primary Examiner* — Robert J Hicks
(74) *Attorney, Agent, or Firm* — Crowell & Moring LLP

(57) ABSTRACT

A fuel tank for a motor vehicle includes at least two parts that are joined together, each part being formed by an injection moulding process. The two parts form a receiving chamber for receiving fuel and form at least one other receiving chamber, the receiving chamber and the other receiving chamber being spatially separated by a portion of at least one part.

12 Claims, 1 Drawing Sheet

(56) References Cited

U.S. PATENT DOCUMENTS

| | | | | |
|---|---|---|---|---|
| 5,129,544 | A * | 7/1992 | Jacobson | B29C 66/1312 |
| | | | | 428/35.8 |
| 5,398,839 | A * | 3/1995 | Kleyn | B60K 15/03177 |
| | | | | 220/555 |
| 5,547,096 | A * | 8/1996 | Kleyn | B60K 15/03177 |
| | | | | 220/62.16 |
| 6,338,420 | B1 * | 1/2002 | Pachciarz | B60K 15/03177 |
| | | | | 220/4.13 |
| 6,435,557 | B1 * | 8/2002 | Palvoelgyi | B60K 15/067 |
| | | | | 280/830 |
| 6,491,180 | B2 * | 12/2002 | Distelhoff | B60K 15/03504 |
| | | | | 220/62.18 |
| 2006/0151505 | A1 * | 7/2006 | Kobayashi | B60K 15/03177 |
| | | | | 220/562 |
| 2012/0145267 | A1 * | 6/2012 | Haslberger | B66F 9/07518 |
| | | | | 220/601 |
| 2017/0174145 | A1 | 6/2017 | Labbe et al. | |
| 2020/0198459 | A1 * | 6/2020 | Bouffier | B29C 65/1635 |

FOREIGN PATENT DOCUMENTS

| | | |
|---|---|---|
| DE | 20 2013 105 753 U1 | 6/2014 |
| DE | 10 2013 004 929 A1 | 9/2014 |
| DE | 10 2014 289 380 A1 | 11/2015 |
| FR | 1 121 318 A | 8/1956 |
| GB | 2526198 A | 11/2015 |
| JP | 1-195193 A | 8/1989 |
| JP | 3-45481 A | 2/1991 |
| WO | WO 00/51858 A1 | 9/2000 |

OTHER PUBLICATIONS

PCT/EP2018/076204, International Search Report dated Dec. 13, 2018 (Two (2) pages).

German Search Report issued in German application No. 10 2017 222 250.6 dated Apr. 30, 2019, with Statement of Relevancy (Seven (7) pages).

U.S. Patent Application, "Fuel Tank for a Motor Vehicle, in Particular for a Motorcycle, and Method for Producing a Fuel Tank", filed Jun. 2, 2020, Inventor Daniel Erhard et al.

* cited by examiner

FUEL TANK FOR A MOTOR VEHICLE, AND METHOD FOR PRODUCING A FUEL TANK

CROSS REFERENCE TO RELATED APPLICATIONS

This application is a continuation of PCT International Application No. PCT/EP2018/076204, filed Sep. 27, 2018, which claims priority under 35 U.S.C. § 119 from German Patent Application No. 10 2017 222 250.6, filed Dec. 8, 2017, the entire disclosures of which are herein expressly incorporated by reference.

BACKGROUND AND SUMMARY OF THE INVENTION

The invention specifies a fuel tank for a motor vehicle. The fuel tank is preferably a fuel tank for a powered cycle, in particular a fuel tank for a motorcycle. The invention further specifies a single-track motor vehicle comprising a fuel tank, and also a method for producing a fuel tank.

Fuel tanks for motor vehicles, in particular for motorcycles, have already long been known from the general prior art and, in particular, from series vehicle construction. A fuel tank of this kind has at least one receiving chamber for receiving fuel, in particular liquid fuel. The fuel can be used to operate, for example, an internal combustion engine for driving the respective motor vehicle.

Fuel tanks of this kind for motorcycles can be produced, for example, by blow molding or by rotational molding. One disadvantage of these methods is that the shaping of the fuel tank is extremely limited. In addition, the integration of the further components is possible only to a very limited extent. Furthermore, an adequate surface quality is often not generated, and therefore the fuel tanks which are produced cannot be used as visible parts.

DE 199 41 785 A1 discloses a method for producing a fuel container, in which method shell parts composed of plastic are initially manufactured using an injection-molding process and the shell parts are then welded to one another.

One disadvantage of the fuel tanks known from the prior art is that they do not fulfil any additional functions—in addition to the main function of receiving fuel.

An object to be achieved of at least some embodiments is therefore that of specifying a fuel tank for a motor vehicle, in particular for a motorcycle, which has additional functions, such as in respect of integrating further components for example. Further objects are those of specifying a single-track motor vehicle comprising a fuel tank of this kind and also a method for producing a fuel tank.

A fuel tank described here has, according to at least one embodiment, at least two partial bodies which are connected to one another and which are formed by an injection-molding process and which form a receiving chamber for receiving fuel. Furthermore, the two partial bodies form at least one further receiving chamber, wherein the receiving chamber and the further receiving chamber are physically separated from one another by at least one subsection of at least one partial body. For example, each of the partial bodies can be formed by a single injection-molding process. The partial bodies can, for example, each be of integral design.

The fuel tank is preferably designed as a fuel tank for a motor vehicle, in particular as a fuel tank for a single-track motor vehicle, such as a motorcycle for example.

The partial bodies preferably contain a plastic, such as a thermoplastic for example, or consist of a plastic or of a thermoplastic. For example, a separating wall can be arranged between the receiving chamber and the further receiving chamber, wherein the separating wall is preferably integrally formed with one of the partial bodies. In particular, the separating wall can be formed during the injection-molding process by means of which one of the partial bodies is produced.

The further receiving chamber can be designed, for example, as an air filter box or as an air box, or, for example, as a cooling-water compensation tank or as a storage compartment.

According to a further embodiment, the fuel tank has a second further receiving chamber which is formed by the two partial bodies. Therefore, the fuel tank can comprise three receiving chambers which are physically separated from one another, wherein the first receiving chamber is designed for receiving fuel. From amongst the other two receiving chambers, for example, one can be designed as an air filter box and the other can be designed as a storage compartment or compensation tank. The individual receiving chambers are preferably physically separated by separating walls which are produced by means of injection-molding processes, in particular at the same time as a partial body is produced.

According to a further embodiment, the fuel tank has one receiving chamber for receiving fuel and also three further receiving chambers, wherein all of the receiving chambers are physically separated from one another by separating walls or subsections of at least one partial body.

According to a further embodiment, one of the partial bodies is designed as a box element and the other of the partial bodies is designed as a cover element. In this case, the separating wall between the receiving chamber and the further receiving chamber is, or the separating walls between the individual receiving chambers are, integrally formed with the box element.

According to a further alternative embodiment, the two partial bodies are each designed as shell elements.

According to a further embodiment, at least one of the partial bodies is provided with at least one reinforcing element locally in at least one subregion. For example, the reinforcing element can comprise a reinforcing arrangement or a rib arrangement or a pitted surface and/or one or more crash elements. The reinforcing element can be, for example, injection-molded on or can be formed when at least one partial body is formed. Furthermore, at least one reinforcing element can be embedded into at least one of the partial bodies. The reinforcing element preferably contains a material which is different from the rest of the partial body.

Owing to the use of the at least one reinforcing element, it is possible to realize sufficient rigidity or strength of the fuel tank in a simple manner which is expedient in respect of weight and installation space and is also particularly cost-effective, so that firstly stringent requirements in respect of toughness and extensibility and secondly stringent requirements in respect of pressure resistance of the fuel tank can be realized.

According to a further embodiment, the reinforcing element is at least partially embedded into the plastic of the at least one partial body. Therefore, the plastic of the at least one partial body at least partially surrounds the reinforcing element on two sides which are different from one another. As a result, the installation space requirement of the motor vehicle can be kept particularly low, wherein particularly advantageous reinforcement can be provided at the same time.

According to a further embodiment, the plastic of the at least one partial body is injection-molded onto the reinforcing element. In this way, the reinforcing element can be integrated into the at least one partial body in a cost-effective manner.

In order to reinforce or brace the at least one partial body in a particularly advantageous manner, provision is made in a further refinement of the invention for the reinforcing element to be completely surrounded by the plastic of the at least one partial body. In the process, for example, the reinforcing element is completely embedded in the plastic of the at least one partial body.

It has further been found to be particularly advantageous when the reinforcing element is connected to the at least one partial body in an interlocking and/or cohesive manner.

According to a further embodiment, each of the two partial bodies has at least one reinforcing element. Furthermore, each of the two partial bodies can have a plurality of reinforcing elements. In this case, the reinforcing elements can have one or more features of the abovementioned embodiments in respect of the reinforcing element of the at least one partial body.

Furthermore, the invention specifies a motor vehicle which has a fuel tank as described here. The motor vehicle is preferably a single-track motor vehicle. In particular, the motor vehicle can be designed as a motorcycle. The fuel tank of the motor vehicle can have one or more features of the abovementioned embodiments. In particular, the fuel tank of the motor vehicle has at least two partial bodies which are connected to one another and which are each formed by an injection-molding process and which form a receiving chamber for receiving fuel, wherein the two partial bodies form at least one further receiving chamber, and wherein the receiving chamber and the further receiving chamber are physically separated from one another by a subsection of at least one partial body.

Furthermore, the invention specifies a method for producing a fuel tank for a motor vehicle. The features mentioned above and in the text which follows in respect of the fuel tank and/or in respect of the method for producing the fuel tank can apply both to the fuel tank per se and also in relation to the method for producing the fuel tank. In particular, the fuel tank which can be produced or is produced by the method described in the text which follows can have one or more features of the abovementioned embodiments.

In the method, two partial bodies are formed by injection molding and, after they are formed, connected, so that the partial bodies, after they are connected, form a receiving chamber for receiving fuel and also at least one further receiving chamber, wherein the receiving chamber and the further receiving chamber, after they are connected, are physically separated from one another by a subsection of at least one partial body. The receiving chambers are physically separated, for example, by one or more separating walls which is or are produced when at least one partial body is formed by injection molding.

The two partial bodies can be connected, for example, by a welding process. The welding process may be, for example, a laser, vibration, contact or mirror welding process. As a result, the fuel tank can advantageously be designed so as to be particularly leaktight or impermeable. As an alternative or in addition, the two partial bodies can also be connected by a plug-in or screw connection.

According to a further embodiment, the two partial bodies are formed by injection molding in such a way that the partial bodies, after they are connected, form a receiving chamber for receiving fuel, and also at least two further receiving chambers, wherein the individual receiving chambers, after they are connected, are respectively physically separated from one another by one or more subsections of at least one partial body.

According to a further embodiment, when forming at least one of the two partial bodies, at least one reinforcing element is embedded into the partial body.

The reinforcing element preferably contains at least one material which is different from the plastic of the at least one partial body. The material which is different from the plastic of the at least one partial body is, for example, a further plastic which is different from the plastic of the at least one partial body or is a metal material.

In order to injection-mold, for example, the at least one partial body or the plastic thereof onto the reinforcing element, the reinforcing element, in particular in its produced state, is, for example, inserted into an injection mold by means of which the injection-molding operation is carried out. This is followed by injection molding, for example, by means of the injection mold, within the scope of which injection molding the plastic from which the at least one partial body is produced is injection-molded onto the reinforcing element which is inserted into the injection mold. The injection molding is casting or a casting process, wherein the reinforcing element is already integrated into the at least one partial body during the casting process. In this way, the reinforcing element can form a particularly intimate connection with the at least one partial body, so that the partial body is reinforced in a particularly advantageous manner.

According to a further embodiment, when forming at least one of the partial bodies by injection molding, one or more further components are integrated into the at least one partial body. The component or the components may be, in particular, fuel tank components, such as lines, filters, filling level sensors, screw closures or tank filler necks for example.

The method described here allows integration of any desired number of auxiliary assemblies or vehicle components, such as filter elements, cooling-liquid compensation tanks, fuel stores, controllers, gasoline pumps etc. for example, into a central injection-molded housing. Furthermore, all relevant components, such as lines, filters, filling level sensors etc. for example, can be integrated in the housing by a box/cover injection-molded housing. The further expenditure on assembly can be considerably reduced in this way. Servicing hatches, such as screw closures, tank filler necks etc. for example, can be integrated into the cover of the injection-molded housing. The fuel tank can be matched to load peaks that arise by way of deliberately introducing strength-increasing components, such as reinforcing arrangements and/or rib arrangements for example. Furthermore, safety in the event of a crash can be increased by means of introducing pitted surfaces and/or crash elements.

The method described here allows a wide variety of configurations by means of simple shaping tools. Furthermore, integration of a plurality of components in a complete system with optimum utilization of installation space is rendered possible.

Further advantages and advantageous embodiments of the fuel tank described here for a motor vehicle or of the method described here for producing a fuel tank can be found in the embodiments described in the text which follows in conjunction with FIGS. 1 to 3.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and Figures, identical or identically acting parts can each be provided with the same reference symbols. The illustrated elements and the proportions thereof in relation to one another should not be regarded as being true to scale in principle. Rather, individual elements may be illustrated with excessively thick or large dimensions to provide clearer illustration and/or better understanding.

Figure 1:
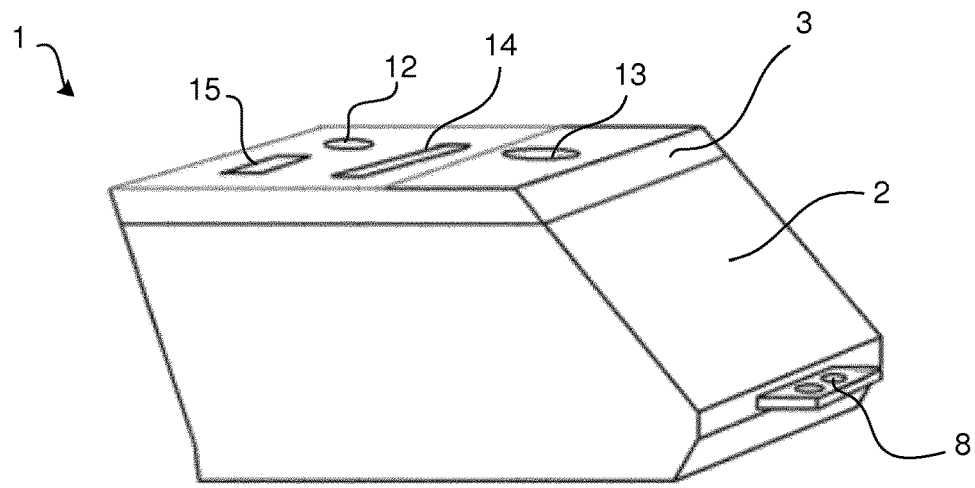
FIG. 1 shows a schematic illustration of a perspective view of a fuel tank according to one exemplary embodiment.
Figure 2:
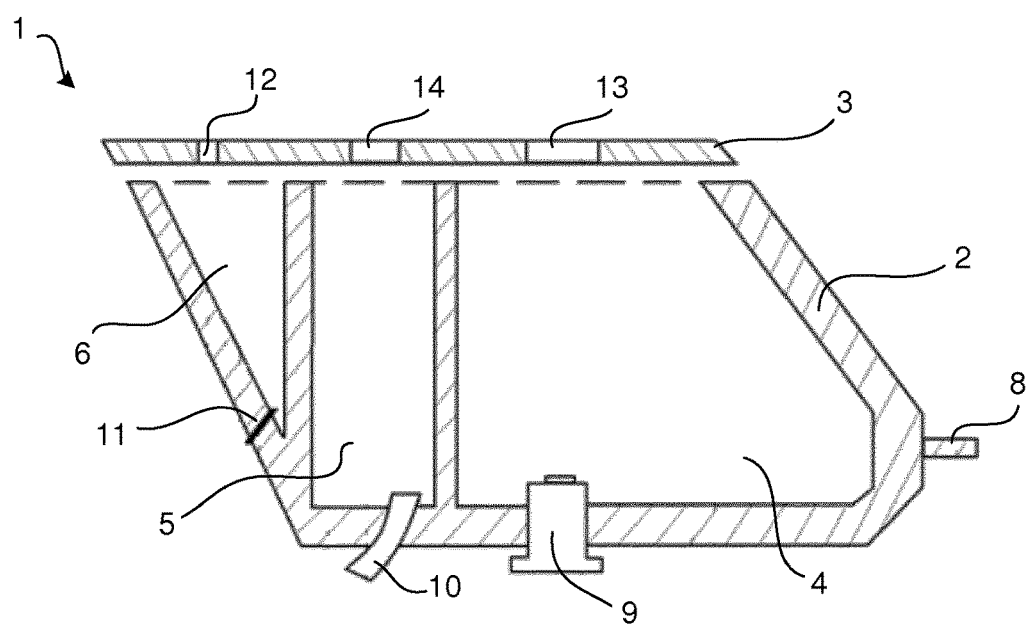
FIG. 2 shows a schematic illustration of a sectional view of the fuel tank according to FIG. 1.
Figure 3:
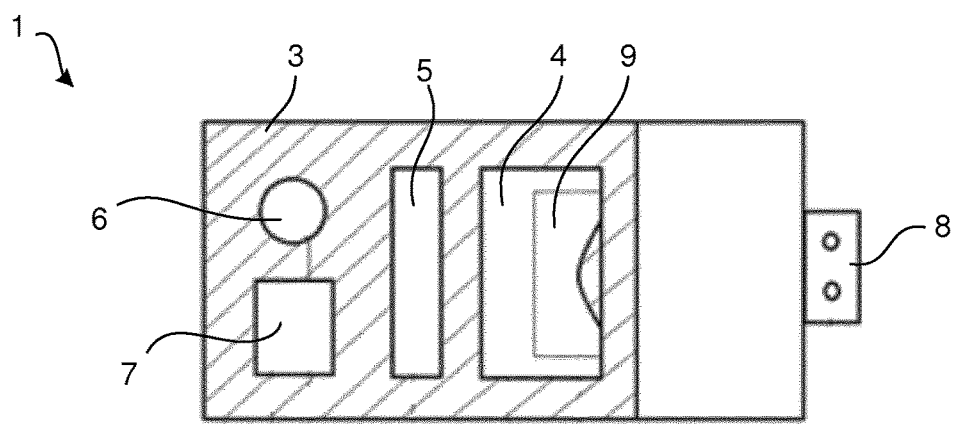
FIG. 3 shows a schematic illustration of a plan view of the fuel tank according to FIG. 1.

FIGS. 1 to 3 show schematic illustrations of a fuel tank 1 according to one exemplary embodiment. The fuel tank 1 has two partial bodies 2, 3 which are connected to one another and which are each formed by an injection-molding process. The first partial body 2 is designed as a box element and the second partial body 3 is designed as a cover element. The two partial bodies 2, 3 form a receiving chamber 4 for receiving fuel. Furthermore, the two partial bodies 2, 3 form three further receiving chambers 5, 6, 7 which are respectively physically separated from one another by subsections or separating walls of the first partial body 2.

In the exemplary embodiment shown, the first further receiving chamber 5 is designed as an air filter box or air box. The second further receiving chamber 6 is designed as a compensation tank. The third further receiving chamber 7 is designed as a storage compartment in the exemplary embodiment shown.

The individual receiving chambers 4, 5, 6, 7 each have an opening, specifically a filling opening 12, an opening 13 for a tank filler neck, a servicing opening 14 and also a storage compartment opening 15.

In a bottom region of the first partial body 2, a fuel delivery unit 9 is arranged in the region of the first receiving chamber 4 and an intake nozzle 10 is arranged in the region of the further receiving chamber 5. A cooling-water connection 11 is arranged in the region of the further receiving chamber 6 which is designed as a compensation tank.

Furthermore, the fuel tank 1 or the first partial body 2 of the fuel tank 1 has a fastening apparatus 8 for fastening the fuel tank 1 to a further body. The fastening apparatus 8 is preferably integrally formed with the fuel tank 1 or with the first partial body 2. For example, the fastening apparatus 8 can be formed when producing the first partial body 2 by means of injection molding.

The features described in the exemplary embodiments shown can also be combined with one another according to further exemplary embodiments. As an alternative or in addition, the exemplary embodiments shown in the Figures may have further features according to the embodiments of the general description.

LIST OF REFERENCE CHARACTERS

1 Fuel tank
2 First partial body
3 Second partial body
4 Receiving chamber
5, 6, 7 Further receiving chamber
8 Fastening apparatus
9 Fuel delivery unit
10 Intake nozzle
11 Cooling-water connection
12 Filling opening
13 Tank filler neck
14 Servicing opening
15 Storage compartment opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A fuel tank for a vehicle, comprising:
a first partial body;
a second partial body, wherein the first partial body and the second partial body are connected to one another and are each formed by an injection-molding process;
wherein the first partial body is a box element and the second partial body is a flat, planar cover element;
wherein the first partial body and the second partial body form a first receiving chamber for receiving fuel and a second receiving chamber, wherein the second receiving chamber is an air filter box or a storage compartment, wherein the first receiving chamber and the second receiving chamber are physically separated from one another solely by a first separating wall of the first partial body, and wherein the first separating wall is connected to the flat, planar cover element.

2. The fuel tank according to claim 1 further comprising a third receiving chamber which is formed by the first partial body and the second partial body.

3. The fuel tank according to claim 2, wherein the third receiving chamber is physically separated from the second receiving chamber solely by a second separating wall of the first partial body.

4. The fuel tank according to claim 1, wherein at least one of the first and second partial bodies includes a reinforcing element locally in at least one respective subregion.

5. The fuel tank according to claim 4, wherein the reinforcing element is at least partially embedded into the at least one of the first and second partial bodies.

6. A single-track motor vehicle, comprising the fuel tank according to claim 1.

7. A method for producing a fuel tank for a motor vehicle, comprising the acts of:
forming a first partial body and a second partial body by injection molding, wherein the first partial body is a box element and the second partial body is a flat, planar cover element; and
connecting the first and second partial bodies such that the first and second partial bodies, after they are connected, form a first receiving chamber for receiving fuel and a second receiving chamber, wherein the second receiving chamber is an air filter box or a storage compartment, wherein the first receiving chamber and the second receiving chamber are physically separated from one another solely by a first separating wall of the first partial body, and wherein the first separating wall is connected to the flat, planar cover element.

8. The method according to claim 7, wherein the first and second partial bodies are connected by a welding process.

9. The method according to claim 7, wherein the first and second partial bodies are connected by a plug-in connection and/or a screw connection.

10. The method according to claim 7, wherein the first and second partial bodies, after they are connected, form a third receiving chamber and wherein the second receiving chamber is physically separated from the third receiving chamber solely by a second separating wall of the first partial body.

11. The method according to claim 7, wherein during the forming, a respective reinforcing element is embedded into at least one of the first and second partial bodies.

12. The method according to claim 7, wherein during the forming, a respective component is integrated into at least one of the first and second partial bodies.

\* \* \* \* \*